United States Patent [19]

Alfrey et al.

[11] Patent Number: 5,056,103
[45] Date of Patent: * Oct. 8, 1991

[54] APPARATUS FOR ALIGNING THE OPTIC AXIS OF AN INTRA-CAVITY BIREFRINGENT ELEMENT, AND TUNABLE LASER USING SAME

[75] Inventors: Anthony J. Alfrey, Half Moon Bay; James A. Palmer, San Jose, both of Calif.

[73] Assignee: Spectra-Physics Lasers, Inc., Mountain View, Calif.

[*] Notice: The portion of the term of this patent subsequent to May 8, 2008 has been disclaimed.

[21] Appl. No.: 469,135

[22] Filed: Jan. 24, 1990

Related U.S. Application Data

[63] Continuation-in-part of Ser. No. 319,980, Mar. 7, 1989, Pat. No. 5,020,073.

[51] Int. Cl.$^5$ ............................................. H01S 3/08
[52] U.S. Cl. .................................. 372/105; 372/108; 372/107; 372/41; 372/34; 372/20
[58] Field of Search ....................... 372/69, 70, 41, 95, 372/34, 92-94, 98, 99, 105, 108

[56] References Cited

U.S. PATENT DOCUMENTS 4,894,831  1/1990  Alfrey .................................. 372/41

OTHER PUBLICATIONS

Arnold L. Bloom, "Modes of a Laser Resonator Containing Tilted Birefringent Plates," Journal of the Optical Society of America, vol. 64, No. 4, Apr. 1974.
Preuss et al., "Three-Stage Birefringent Filter Turning Smoothly Over the Visible Region:Theoretic Treatment and Experimental Design," Applied Optics, vol. 19, No. 5, Mar. 1, 1980.
Holtom et al., "Design of a Birefringent Filter for High--Power Dye Lasers" IEEE Journal of Quantum Electronics, vol. QE-10, No. 8, Aug. 1974.
Mudare et al., "Simple Alignment Procedure for the Assembly of Three-Plate Birefringent Filters for Tumble Dye Lasers," Applied Optics, vol. 22, No. 5, Mar. 1983.
November et al., "Derivation of the Universal Wavelength Tuning Formula for a Lyot Birefringent Filter," Applied Optics, vol. 23, No. 14, Jul. 15, 1984.
Peter A. Schulz, "Single-Frequency Ti:Al$_2$O$_3$ Ring Laser," IEEE Journal of Quantum Electronics, vol. 24, No. 6, Jun. 1988.

Primary Examiner—Leon Scott, Jr.
Attorney, Agent, or Firm—Fliesler, Dubb, Meyer & Lovejoy

[57] ABSTRACT

Alignment of a birefringent device characterized by a first face and a second face cut at Brewster's angle so that a plane of polarization is defined. The optical device is secured in the optical path by a rotatable member having an axis of rotation that is normal to the Brewster faces of the optical device. Coupled with the rotatable member on the axis of rotation is a support allowing adjustment of the angular position about the axis of rotation of the rotatable member. An operator adjusts the angular position of the rotatable member until the C-axis lies in the plane of polarization. Even though the C-axis may not be parallel to the direction of polarization, the depolarization effects of the misalignment are eliminated by proper adjustment of the angular position relative to the plane of polarization. A tunable, solid state laser using the alignment apparatus with a birefringent filter achieves greater linear tuning range.

26 Claims, 4 Drawing Sheets

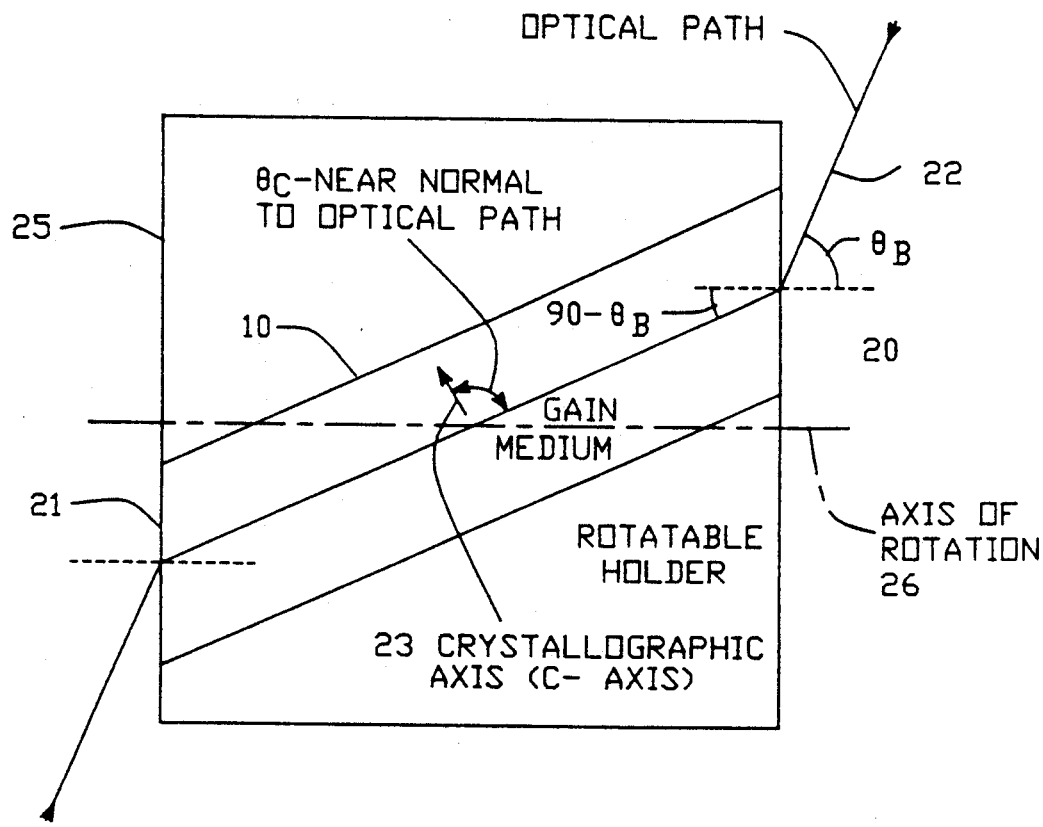
FIG.—2
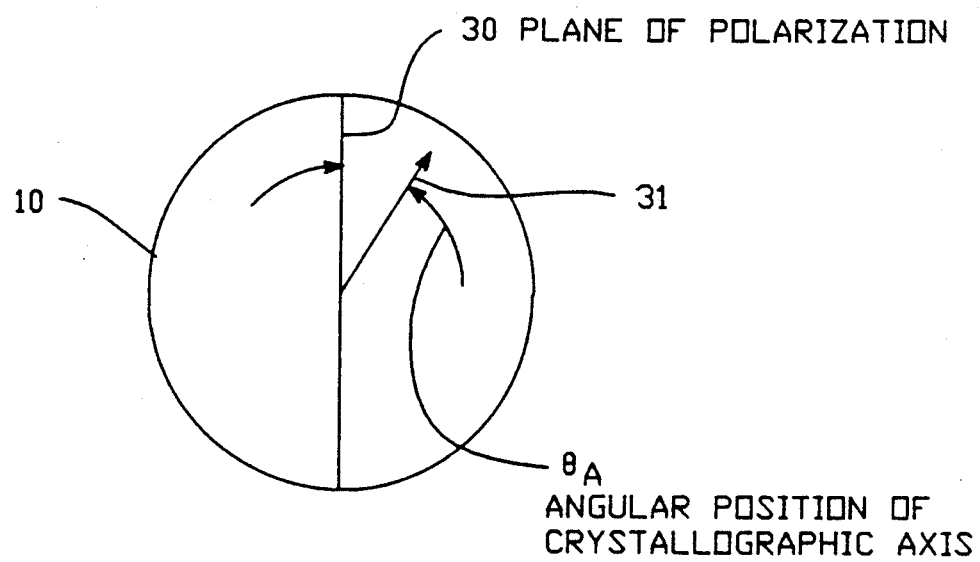
FIG.—3

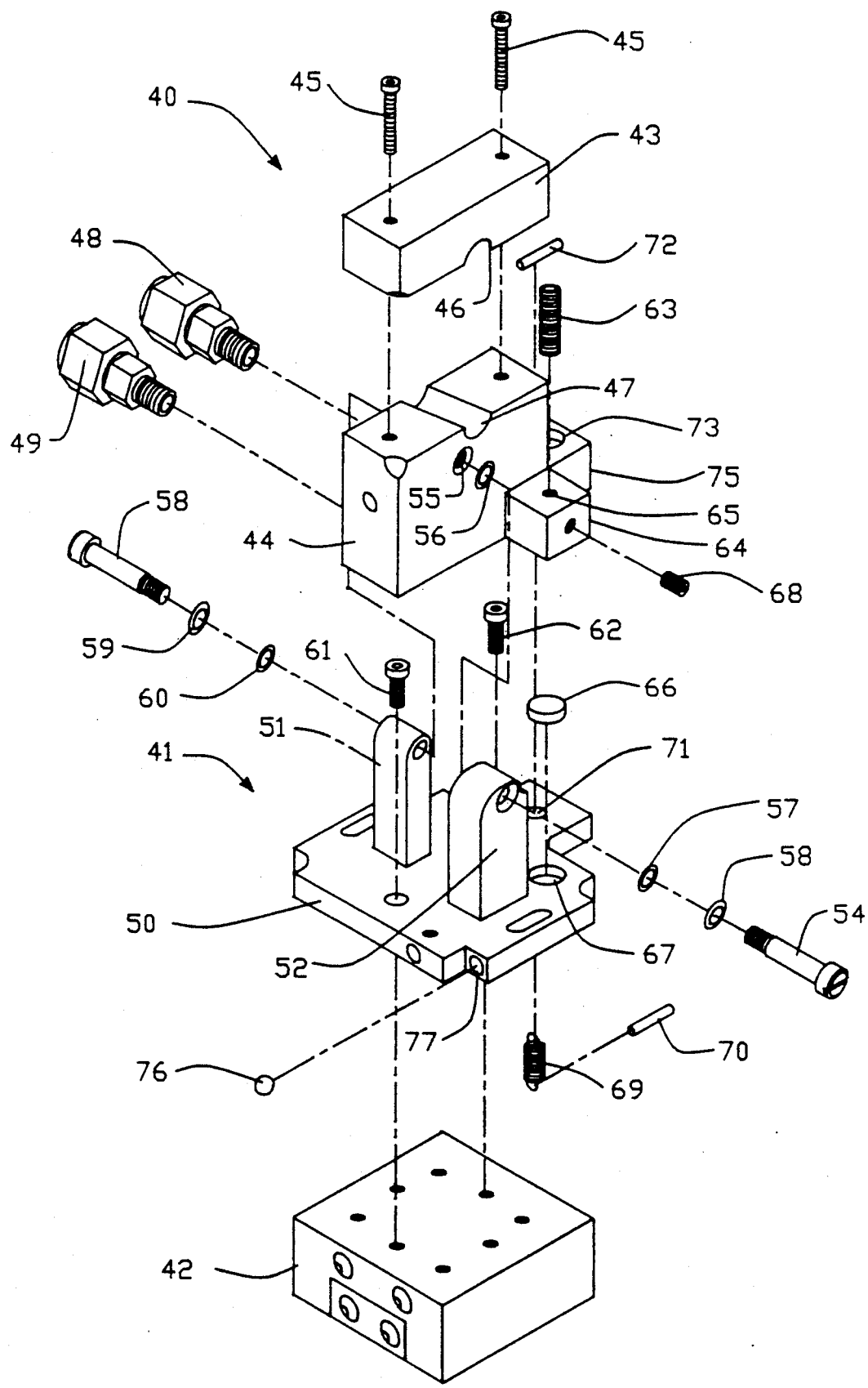
FIG.—4

APPARATUS FOR ALIGNING THE OPTIC AXIS OF AN INTRA-CAVITY BIREFRINGENT ELEMENT, AND TUNABLE LASER USING SAME

CONTINUING APPLICATION DATA

This is a continuation-in-part of U.S. patent application Ser. No. 07/319,980, now U.S. Pat. No. 5,020,073 filed Mar. 7, 1989.

CROSS-REFERENCE TO RELATED APPLICATIONS

The following U.S. patent application is incorporated by reference as if fully set forth herein, and is related to the present application.

1. Woodward et al., TUNABLE DYE LASER WITH THIN BIREFRINGENT FILTER FOR IMPROVED TUNING, Ser. No. 07/260,980; Filed Oct. 21, 1988.

The above listed related applications was owned at the time of invention and is currently owned by the same assignee as the present invention.

BACKGROUND OF THE INVENTION

1 Field of the Invention

The present invention relates to the alignment of a crystalline axis of an optical device having Brewster faces; and, more particularly, to aligning a crystalline axis of a birefringent element so that it lies in the plane of the polarization defined by Brewster faces of the birefringent element.

2. Description of Related Art

Optical devices having Brewster cut faces are in widespread use. Brewster faces define a plane of polarization for light propagating though the optical device. Many such devices are fabricated from crystalline material with well-defined crystalline axes. Such optical devices are manufactured so that one such crystalline axis is as close to the direction of polarization as possible. However, with current manufacturing techniques, it is difficult to ensure that the selected crystalline axis is closely aligned with the direction of polarization.

Where the optical device is birefringent and defines a long path between the Brewster faces, this misalignment of the crystalline axis can result in significant depolarization effects. When such an optical device is used in a laser cavity that includes another element which is sensitive to polarization, the depolarization effects can have an effect on the performance of the sensitive element. For instance, birefringent filters in widespread use in tunable lasers are very sensitive to the polarization of the beam in the cavity. Background concerning birefringent filters can be found in Bloom, "Modes of a Laser Resonator Containing Tilted Birefringent Plates", JOURNAL OF THE OPTICAL SOCIETY OF AMERICA, Vo., 64, No. 4, April 1974; Preuss et al., "Three-Stage Birefringent Filter Tuning Smoothly Over the Visible Region: Theoretic Treatment and Experimental Design", APPLIED OPTICS, Vol. 19, No. 5, 1 Mar. 1980; Holtom et al., "Design of a Birefringent Filter for High-Power Dye Lasers", IEEE JOURNAL OF QUANTUM ELECTRONICS, Vol. QE-10, No. 8, August 1974; Mudare et al., "Simple Alignment Procedure for the Assembly of Three-Plate Birefringent Filters for Tunable Dye Lasers", APPLIED OPTICS, Vol. 22, No. 5, 1 Mar. 1983; and November et al., "Derivation of the Universal Wavelength Tuning Formula for a Lyot Birefringent Filter", APPLIED OPTICS, Vol. 23, No. 14, 15 July 1984.

One of the factors which limits the smooth tuning range of tunable solid state lasers, such as those using a Ti:sapphire or a cobalt magnesium fluoride gain medium, is the misalignment of the selected crystalline axis of the gain medium with resulting depolarization, affecting the operation of the birefringent tuning filter. As recognized in Schulz, "Single-Frequency Ti:$Al_2O_3$ Ring Laser", IEEE JOURNAL OF QUANTUM ELECTRONICS, Vol. 24, No. 6, June 1988, it is very important to ensure that the crystallographic orientation of the Brewster faces aligns the C-axis of the Ti:sapphire crystal as close as possible to the direction of polarization of the laser beam. However, due to the relatively long optical path through the gain medium, the effect of a small misalignment can be significant.

An adjustment of the C-axis might be achieved in the prior art by simply rotating the rod about an axis collinear with the axis of propagation of the laser light within the rod. However, such a rotation would change the orientation of the Brewster faces of the rod with respect to the optical path, resulting in a misalignment of the laser cavity. Such an adjustment would then require the re-alignment of the remaining cavity components with each adjustment of the rod.

Accordingly, it is desirable to have an apparatus for minimizing the depolarizing effect of misalignment of the optic axis of birefringent elements with respect to Brewster cut faces of those elements. Further, it is desirable to make such an alignment adjustment without disturbing the operation of the laser cavity.

SUMMARY OF THE INVENTION

The present invention provides an apparatus for aligning an optical device in an optical path. The optical device is characterized by a first face and a second face cut at Brewster's angle so that a plane of polarization is defined, and by having a direction of propagation extending between the first and second faces. The optical device is secured in the optical path by a rotatable member having an axis of rotation that is normal to the Brewster faces of the optical device.

Coupled with the rotatable member on the axis of rotation is a support connected on the axis of rotation allowing adjustment of the angular position about the axis of rotation of the rotatable member. Using an adjuster, connected to the support and the rotatable member, an operator adjusts the angular position of the rotatable member until a selected crystalline axis (i.e. C-axis for Ti:Sapphire) lies in the plane of polarization. Even though the crystalline axis may not be parallel to the direction of polarization, it is sufficient that the crystalline axis be aligned to lie within the plane of polarization to eliminate depolarization effects.

According to another aspect, the present invention is a tunable laser comprising a laser cavity defining an optical path. A birefringent filter, or other means for tuning the laser, is mounted within the laser cavity along an optical path, allowing for tuning of the output wavelength of the laser. A birefringent gain medium is mounted within the optical path. The gain medium has a first face and a second face cut at Brewster's angle so that a plane of polarization is defined and has a direction of propagation extending between the first and second faces. The birefringent gain medium is mounted in a rotatable member having an axis of rotation which is normal to the first face of the gain medium. The rotatable member is supported on its axis of rotation in the optical path by an element allowing for adjustment of the angular position about the axis of rotation of the rotatable member to minimize the effect of the birefringent gain medium on the operation of the birefringent filter.

According to yet another aspect, the rotatable member is formed of heat conducting material in heat flow communication with the gain medium, or other optical device. In one embodiment, channels are cut in the rotatable member to provide a path for flow of a heat transfer medium in contact with the rotatable member to control the temperature of the optical device.

Other aspects, features and advantages of the present invention can be seen upon review of the figures, detailed description and claims which follow.

BRIEF DESCRIPTION OF THE FIGURES

FIG. 2 is a top view diagram illustrating the geometry of the birefringent gain medium in a rotatable holder.

FIG. 3 is an end view diagram of the gain medium used in illustrating the angular position of a selected crystalline axis of the gain medium.

FIG. 4 is an exploded view of a rotatable mount for securing the birefringent gain medium in the optical path of the laser cavity.

DETAILED DESCRIPTION

With reference to the figures, a detailed description of a preferred embodiment of the present invention is provided.

Figure 1:
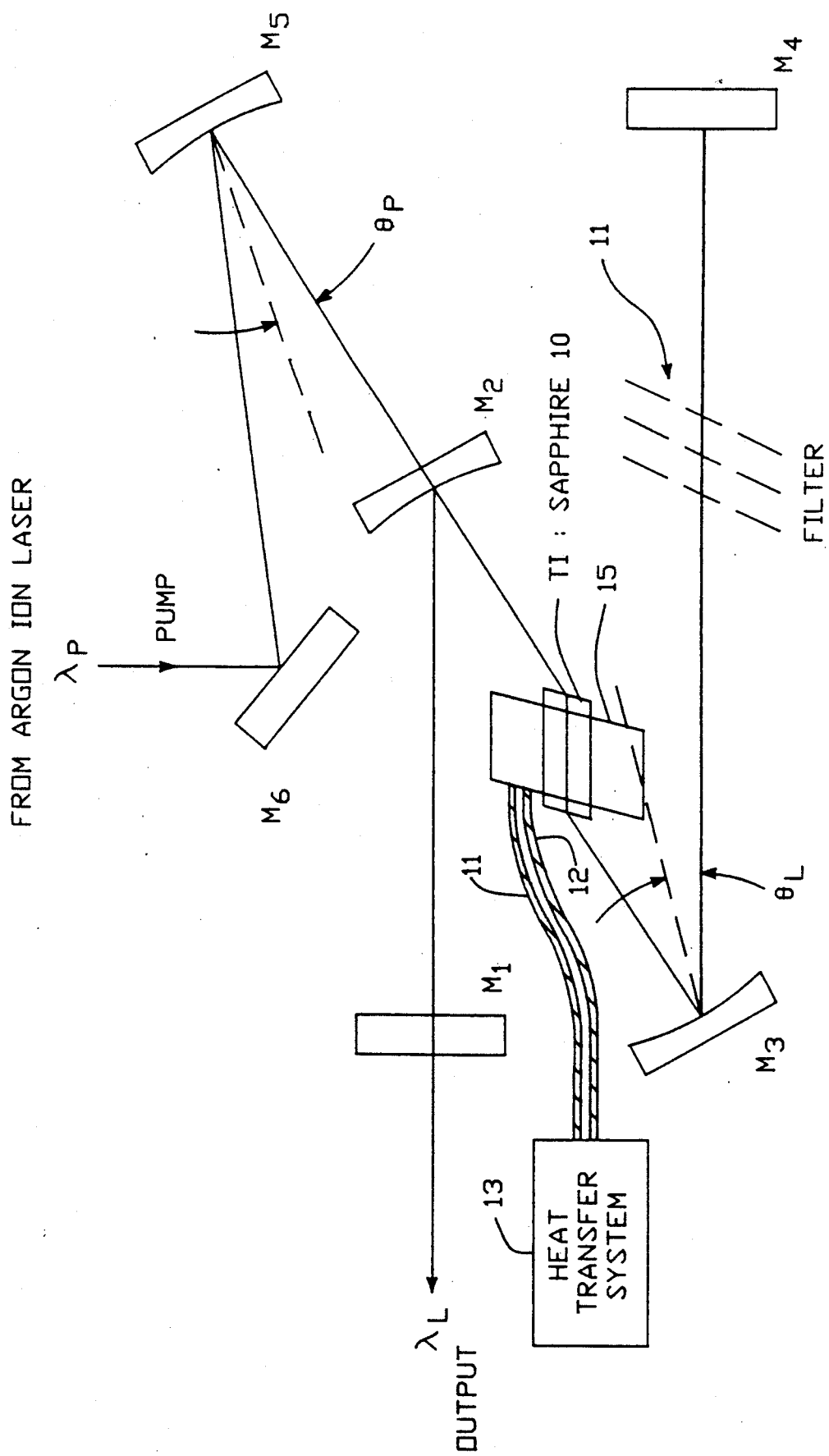
FIG. 1 is a schematic diagram of a tunable laser with a birefringent gain medium according to the present invention.

FIG. 1 is a schematic diagram of a laser system in which a preferred embodiment of the present invention is applied. The laser system illustrated in FIG. 1 is described in detail in U.S. Pat. No. 4,894,831 entitled LONGITUDINALLY PUMPED LASER OSCILLATOR. FIGS. 2 and 3 illustrate misalignment of a crystalline axis (e.g. C-axis) in a titanium:sapphire rod with respect to Brewster faces of the rod.

Figure 5:
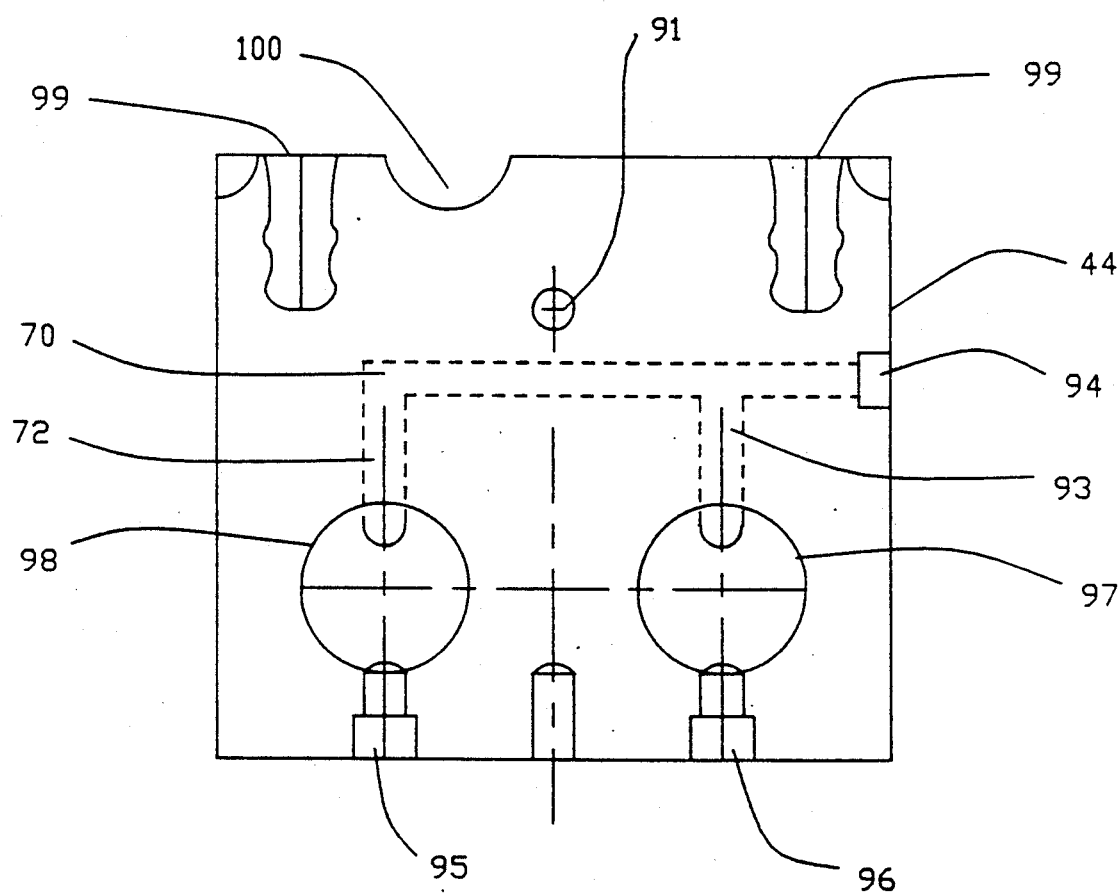
FIG. 5 illustrates the mechanism for flowing a cooling medium through the rotatable holder.

FIGS. 4 and 5 set forth a preferred embodiment of the means for aligning the gain medium or another optical element according to the present invention.

FIG. 1 illustrates a longitudinally pumped folded cavity Ti:sapphire laser resonator. The resonator consists of a flat output coupler M1 with a transmission T equal to 3.5 percent, spherical concave mirror M2 with a radius of 10 cm, spherical concave mirror M3 with a radius of 10 cm, and a flat high reflector M4. Mirrors M2 and M3 are high reflectors at the laser wavelength $\lambda_L$ and transparent at the pump wavelength $\lambda_p$. A Ti:sapphire rod Brewster cut to a path length of 2 cm with a crystal C-axis cut to be as closely parallel to the optical electric field as possible is utilized. This optical electric field defines a plane of polarization for the cavity mode within the rod, and its direction is determined by the orientation of the Brewster faces of the rod. The geometry of the C-axis, which is a crystalline axis of the Ti:sapphire crystal, is described in more detail with reference to FIGS. 2 and 3.

In the laser resonator of FIG. 1, a longitudinal pump beam is supplied from an argon ion laser. The pump beam is guided off a first flat reflector M6 to spherical concave mirror M5. Mirror M5 is a high reflector which guides the pump beam through mirror M2 collinearly with the cavity mode in the Ti:sapphire rod 10.

The resonator is tuned through a range of 700–1000 nanometers with a birefringent filter 11 such as is described in the above cross-referenced U.S. patent application entitled TUNABLE DYE LASER WITH THIN BIREFRINGENT FILTER FOR IMPROVED TUNING.

An alignment apparatus 15 secures the Ti:sapphire rod within the optical path of the laser resonator. The alignment apparatus is described in detail with reference to FIGS. 4–5.

A heat transfer medium, such as water, is flowed in contact with the alignment apparatus 15 through tubes 11, 12 from a heat transfer system 13 to control the temperature of the gain medium 10.

FIG. 2 is a top view of the Ti:sapphire gain medium used in the laser resonator of FIG. 1 in a rotatable holder 25. The gain medium 10 includes a first face 20, and a second face 21 which are cut optically parallel and at Brewster's angle so that a beam along optical path 22 entering first face at Brewster's angle $\theta_B$ will be transmitted with a plane of polarization defined by the Brewster angle through the Ti:sapphire crystal 10.

The Ti:sapphire crystal 10 is cut so that the crystalline axis 23 is oriented with respect to the Brewster faces so that $\theta_c$ is parallel as practical to the optical electric field normal to the optical path. However, due to manufacturing tolerances of a couple of degrees, the crystalline axis 23 will be non-parallel. It is difficult using present techniques to ensure that the crystalline axis is within better than $\frac{1}{2}$ of one degree of the direction of the optical electric field.

According to the present invention, the crystal 10 is mounted in a rotatable holder 25 having an axis of rotation 26 that is perpendicular to the Brewster faces. The axis 26 is shown in FIG. 2 centered from the top view, but it need not be so centered.

FIG. 3 illustrates another characteristic of the misalignment of the optic axis. In particular, the Brewster faces 20 and 21 define a plane of polarization 30. FIG. 3 is an end view of the rod showing a plane of polarization 30. The line 31 represents a crystalline axis on the plane of the paper. The plane of the paper is normal to the plane of polarization. As can be seen, the crystalline axis has an angular position $\theta_A$ with respect to the plane of polarization 30.

Because of the misalignment of the crystalline axis as illustrated in FIGS. 2 and 3, and because of the birefringence of a Ti:sapphire rod, slight depolarization of the beam passing along the optical path 22 occurs. This is particularly problematic if the gain medium 10 has substantial length.

As mentioned above with respect to the Schulz article, this misalignment of the crystalline axis and the resulting depolarization, has an effect on the operation of the birefringent filter in the laser resonator. Therefore, the present invention includes an alignment apparatus (referred to schematically by reference manual 15 in FIG. for aligning the crystalline axis in the plane of polarization 30. Even though the crystalline axis remains non-parallel to the optical electric field, it lies essentially within the plane of polarization 30 and the birefringence effects of the rod are not seen in terms of depolarization. Rather they occur merely as a slight loss in gain in the rod due to misalignment reflected in $\theta_c$.

The alignment apparatus 15 according to the present invention is illustrated in FIGS. 4 and 5. FIG. 4 is an exploded view of the alignment apparatus according to the present invention. The alignment apparatus includes a rotatable member 40, a mount 41 allowing adjustment of the angular position of the rotatable member 40, an adjustment mechanism (block 64, screw 63, spring 69) and a translation member 42 on which the mount 41 is secured.

The rotatable member 40 includes a first part 43 and a second part 44. First and second parts 43, 44 are connected by screws 45. The first part 43 has a channel 46 machined on the surface between the first part 43 and the second part 44. This channel is adapted to receive a Brewster cut rod of a laser gain medium with the Brewster faces exposed at either end of the channel 46. Likewise, the second part 44 has a channel 47 machined in the surface between the second part 44 and the first part 43. The channel 47 matches the channel 46 to form an enclosure for supporting the laser gain medium. The channels 46, 47 are lined with a soft metal foil, such as indium, (not shown) so that the fit of the gain medium within the channels 46, 47 is snug and provides good heat flow communication between the rotatable member 40 and the gain medium. The foil may not be necessary in some embodiments.

Fittings 48, 49 are adapted to be screwed into the second part 44 to provide a flow of heat transfer medium such as water through tubes machined in the part 44. This is more clearly illustrated in FIG. 5.

The support 41 includes an adapter plate 50 upon which bearing posts 51 and 52 are mounted. Bearings 53 and 54 are inserted through bearing posts 51 and 52 respectively and screwed into the second part 44 of the rotatable member 40 at respective mating passages on the axis of rotation, e.g. passage 55. A lock washer 56 secures the bearings 53 and 54 into the rotatable member 40. Washers 57 and 58 couple with the bearing posts 52 to allow rotation of the bearing 54 and the rotatable member 40 through the bearing post 52. Likewise, washers 59 and 60 allow rotation of the bearing 53 through bearing posts 51 with the rotatable member 40. Screws 61 and 62 are used to secure the adapte plate 50 of the support 41 onto the translation member 42.

Adjustment of the angular position of the rotatable member 40 is accomplished by bearings 53 and 54 connected at the axis of rotation of the rotatable member 40 in combination with adjustment screw 63. The adjustment screw 63 is connected through block 64 machined into the second part 44 of the rotatable member 40. This block 64 has a threaded passage 65 which receives the adjustment screw 63. The adjustment screw 63 contacts pad 66 which is bonded to the adapter plate 50 at a position 67 to one side of the axis of rotation. A lock screw 68 is used to secure the adjustment screw, and thereby the position of the rotatable member 40 after adjustment.

Spring 69 is connected through roll pin 70 which is secured to the underside of the adapter plate 50 beneath passage 71 and through roll pin 72 which is secured to the side of the second part 44 of the rotatable member 40 through passage 73. The passage 73 is formed on block 75 which is bonded to the second part 44. The spring 69 tends to hold the position of the rotatable member against the position set by the adjustment screw 63.

Ball 76 is bonded to the side of the adapter plate 50 at position 77 to provide a contact point for translation positioning of the gain medium alignment apparatus.

The translation member 42 is a commercially available apparatus providing precision translation movement of the apparatus. Such members are commercially available from Daedal, Inc. in Harrison City, Pa.

The rotatable member 40 is manufactured using a material with good heat transfer characteristics and that is suitable for precision manufacturing, such as a tellurium/copper alloy (UNS C14500). The support structure 41 is manufactured using aluminum, but can be made of any of a variety of materials that allow for precision adjustment of the position.

FIG. 5 shows a side view of the second part 44 of the rotatable member 40. This illustrates schematically the cooling passages formed in the second part 44 of rotatable member. These passages are formed by boring a passage 90 horizontally through the center of the part below the axis of rotation 91. Likewise, two vertical passages 92, 93 are drilled to intersect with horizontal passage 90. Passages 90, 92 and 93 are sealed with plugs 94, 95 and 96, respectively. Threaded holes 97 and 98 are then drilled into the vertical passages 92, 93 and threaded to mate with the nozzles 48, 49 (FIG. 4) to provide a passage for flowing a heat transfer medium through the block 44. FIG. 5 also shows the position of holes 99 drilled to receive the screws 45 (FIG. 4) to secure the first part to the second part 44 of the rotatable member 40.

As can be seen, the axis of rotation 91 is formed below the passage 100 which is machined to receive the gain medium. Likewise, the axis for rotation 91 does not intersect the gain medium in the preferred embodiment. However, this axis for rotation could be positioned anywhere that allows the mechanical free range of motion of a few degrees rotation for adjustment of the alignment of the gain medium as discussed above.

For the titanium:sapphire embodiment discussed above, the heat transfer mechanism will be used to cool the gain medium. For some embodiments, temperature control of the gain medium, or other optical device mounted in this alignment member, may be desired other than cooling. For instance certain gain media require elevated temperature for efficient operation. The heat transfer medium could be used to maintain the temperature of the gain medium or other optical device at a preferred level.

The water cooled member shown in FIG. 5 is representative of a range of temperature control mechanisms available, including thermo-electric cooling, air cooling fins with active or passive airflow mechanisms, liquid cooling in direct contact with the gain medium, and others.

It can be seen that by mounting the optical device, such as the Ti:sapphire gain medium, in the rotatable member 40, so that the axis of rotation of the rotatable member is normal to the Brewster face of the optical device, the rotatable member acquires an adjustable angular position about the axis of rotation relative to the plane of polarization through the optical device. The adjustment screw 63 provides a means for adjusting the angular position about the axis of rotation of the rotatable member so that a crystalline axis of the optical device can be brought within the plane of the polarization.

It will be appreciated by those in the art that the rod shaped gain medium is not the only optical device that could be aligned using an apparatus according to the present invention. Different shaped optical devices would result in different shaped passages through the rotatable member 40.

A key feature of the invention is that the rod adjustment may be undertaken during the operation of the laser without causing misalignment of the optical path with respect to the other components of the laser cavity (e.g. mirrors, filters).

The foregoing description of a preferred embodiment of the present invention has been provided for the purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for supporting an optical device in an optical path, the optical device having a first face and a second face, at least one of the first and second faces at Brewster's angle so that a plane of polarization is defined, comprising:

rotatable means, having an axis of rotation and an adjustable angular position about the axis of rotation, for supporting the optical device, wherein the axis of rotation is normal to the one face at Brewster's angle;

support means, connected to the rotatable means, for supporting the optical device in the optical path so that the optical path intersects the first and second faces and so that the axis of rotation does not intersect the optical device;

means, connected to the rotatable means and the support means, for adjusting the adjustable angular position relative to the plane of polarization.

2. The apparatus of claim 1, wherein the optical device is birefringent.

3. The apparatus of claim 1, wherein the optical device comprises an anisotropic crystal.

4. The apparatus of claim 1, wherein the optical device comprises a rod-shaped laser gain medium.

5. The apparatus of claim 1, wherein the optical device is a laser gain medium.

6. The apparatus of claim 1, wherein the optical device comprises crystalline titanium sapphire having a C-axis, and the C-axis lies in a plane having an angular position about the axis of rotation determined by the adjustable angular position.

7. The apparatus of claim 1, wherein the rotatable means comprises heat conducting material, and further including:

means, coupled to the rotatable means, for flowing a heat transfer medium in contact with the heat conducting material.

8. The apparatus of claim 1, further including:

means, in heat flow communication with the gain medium, for controlling the temperature of the gain medium.

9. An apparatus for generating a laser beam, comprising:

an optical resonant cavity defining an optical path;

a birefringent filter mounted within the resonant cavity along the optical path;

a gain medium, the gain medium having a first face and a second face, at least one of the first and second faces at Brewster's angle so that a plane of polarization is defined;

rotatable means, having an axis of rotation and an adjustable angular position about the axis of rotation, for supporting the gain medium so that the gain medium has an adjustable angular position about the axis of rotation, wherein the axis of rotation is normal to the one face at Brewster's angle;

support means, connected to the rotatable means, for supporting the optical device in the optical path so that the optical path intersects the first and second faces and so that the axis of rotation does not intersect the gain medium;

means, connected to the rotatable means and the support means, for adjusting the adjustable angular position relative to the plane of polarization; and means, coupled with the resonant activity, for supplying a pump energy beam longitudinally into the gain medium through at least one of the first and second faces.

10. The apparatus of claim 9, wherein the gain medium comprises an anisotropic crystal having a C-axis, and the C-axis lies in a plane having an angular position about the axis of rotation determined by the adjustable angular position.

11. The apparatus of claim 9, wherein the gain medium is rod-shaped.

12. The apparatus of claim 9, wherein the gain medium comprises crystalline titanium sapphire having a C-axis, and the C-axis lies in a plane having an angular position about the axis of rotation determined by the adjustable angular position.

13. The apparatus of claim 9, wherein the rotatable means comprises heat conducting material, and further including:

means, coupled to the rotatable means, for flowing a heat transfer medium in contact with the heat conducting material.

14. The apparatus of claim 9, further including:

means, in heat flow communication with the gain medium, for controlling the temperature of the gain medium.

15. An apparatus for supporting an optical device in an optical path, the optical device having a first face and a second face, at least one of the first and second faces cut at Brewster's angle so that a plane of polarization is defined, comprising:

rotatable means, having an axis of rotation and in heat flow communication with the optical device, for supporting the optical device so that the optical path intersects the first and second faces and the optical device has an adjustable angular position about the axis of rotation, and wherein the axis of rotation is normal to the one face at Brewster's angle;

means, in heat flow communication with the optical device, for controlling temperature of the optical device;

support means, connected to the rotatable means, for supporting the optical device so that the optical path intersects the first and second faces; and means, connected to the rotatable means and the support means, for adjusting the adjustable angular position relative to the plane of polarization.

16. The apparatus of claim 15, wherein the optical device is birefringent.

17. The apparatus of claim 15, wherein the optical device comprises an anisotropic crystal.

18. The apparatus of claim 15, wherein the optical device comprises a rod-shaped laser gain medium.

19. The apparatus of claim 15, wherein the optical device is a laser gain medium.

20. The apparatus of claim 15, wherein the optical device comprises crystalline titanium sapphire having a C-axis, and the C-axis lies in a plane having an angular position about the axis of rotation determined by the adjustable angular position.

21. The apparatus of claim 15, wherein the support means is connected to the rotatable means on the axis of rotation.

22. The apparatus of claim 15, wherein the means for controlling temperature comprises:
means, coupled to the rotatable means, for flowing a heat transfer medium in contact with the rotatable means.

23. An apparatus for generating a laser beam, comprising:
an optical resonant cavity defining an optical path;
tunable means, mounted within the resonant cavity, for tuning the resonant cavity to select a wavelength of oscillation over a range of wavelengths;
a gain medium comprising an anisotropic crystalline material having a crystalline axis and capable of supporting laser gain over the range of wavelengths, the gain medium having a first face and a second face at Brewster's angle so that a plane of polarization is defined;
rotatable means, having an axis of rotation, for supporting the gain medium so that the axis of rotation is normal to the first face and the gain medium in the rotatable means has an adjustable angular position about the axis of rotation;
support means, connected to the rotatable means, for supporting the gain medium in the optical path so that the axis of rotation does not intersect the gain medium;
connected to the rotatable means and the support means, for adjusting the adjustable angular position in order to align the crystalline axis essentially within the plane of polarization; and
means, coupled with the resonant activity, for supplying a pump energy beam longitudinally into the gain medium through at least one of the first and second faces.

24. The apparatus of claim 23, further including:
means, connected to the rotatable means, for supplying a heat transfer medium in contact with the rotatable means to control temperature of the gain medium.

25. The apparatus of claim 23, wherein the gain medium is rod-shaped.

26. The apparatus of claim 23, wherein the gain medium comprises titanium:sapphire.

* * * * *